United States Patent
Maggiolo

(10) Patent No.: US 6,923,032 B2
(45) Date of Patent: Aug. 2, 2005

(54) FORMING TOOL MOVEMENT UNIT, PARTICULARLY FOR MANIFOLD CLOSING MACHINES

(75) Inventor: Vinicio Maggiolo, Montagnana (IT)

(73) Assignee: C.M.S. Costruzione Macchine Speciali S.r.l., Alonte (IT)

(*) Notice: Subject to any disclaimer, the term of this patent is extended or adjusted under 35 U.S.C. 154(b) by 196 days.

(21) Appl. No.: 10/627,698

(22) Filed: Jul. 28, 2003

(65) Prior Publication Data

US 2005/0072279 A1 Apr. 7, 2005

(30) Foreign Application Priority Data

Aug. 7, 2002 (IT) .................................... PD2002A0219

(51) Int. Cl.[7] ................................................ B21D 3/02
(52) U.S. Cl. ............................ 72/121; 72/102; 72/120
(58) Field of Search ......................... 72/102, 120, 121, 72/408, 453.1; 29/890.08

(56) References Cited

U.S. PATENT DOCUMENTS

| | | | | |
|---|---|---|---|---|
| 3,225,998 A | * | 12/1965 | Bowman | 228/2.3 |
| 3,265,279 A | * | 8/1966 | Bowman | 228/17 |
| 4,065,953 A | | 1/1978 | Frentzen et al. | |
| 4,627,257 A | * | 12/1986 | McElhaney | 72/102 |
| 4,873,856 A | * | 10/1989 | King | 72/121 |
| 5,467,627 A | * | 11/1995 | Smith et al. | 72/121 |
| 6,067,833 A | | 5/2000 | Irie | |
| 6,295,856 B1 | * | 10/2001 | Tobimatsu et al. | 72/121 |

FOREIGN PATENT DOCUMENTS

FR    2 501 547    9/1982

OTHER PUBLICATIONS

Patent Abstracts of Japan vol. 1998, No. 09, Jul. 31, 1998 –JP 10 109128 A (Segawa Kihachiro), Apr. 28, 1998 *abstract*.

* cited by examiner

Primary Examiner—Ed Tolan
(74) Attorney, Agent, or Firm—Guido Modiano; Albert Josif; Daniel O'Byrne

(57) ABSTRACT

A forming tool movement unit, particularly for manifold closing machines, comprising a rotating head supporting forming tools slidable in mutually opposite radial directions with coordinated movements, a supporting frame on which a supporting element is slidable in axial direction with a stroke controlled electronically, the body of a first double-acting actuator being coupled to the supporting element for rotation and movement in an axial direction, the actuator being connected to a motor, and the body of the first actuator supporting coaxially and at the front the head into which its stem extends movable with a stroke controlled electronically and with the head connected to the forming tools.

17 Claims, 8 Drawing Sheets

FORMING TOOL MOVEMENT UNIT, PARTICULARLY FOR MANIFOLD CLOSING MACHINES

BACKGROUND OF THE INVENTION

The present invention relates to a forming tool movement unit, particularly for manifold closing machines.

As is known, some kinds of finned unit are provided with manifolds that are butt-welded to the ends of the pipes for the passage of the heat transfer fluid.

The manifolds are obtained from tubular segments, whose ends are closed by plastic deformation, forming flat bottoms, and on the cylindrical wall of which holes are then formed, the ends of the pipes being then welded onto said holes.

So-called manifold closing machines are used to close the ends of the tubular segments.

The pipes are arranged on a clamp, with the end to be closed directed toward a rotating head that supports, in a cantilevered fashion, two forming tools that can slide in mutually opposite radial directions with coordinated motions.

Once the working cycle has been started, the forming tools are actuated so as to move mutually closer, while the head rotates at high speeds, causing the plastic deformation of the free end of the tube until a flat closure bottom is obtained.

The main limitation of known equipment is that it is possible to produce only flat bottoms, to the detriment of resistance to high pressures of the manifolds and of the manufacturing flexibility of said equipment.

SUMMARY OF THE INVENTION

The aim of the present invention is to provide a forming tool movement unit, particularly for manifold closing machines, that allows to have control over multiple axes of the movement of the tools.

Within this aim, an object of the invention is to provide a movement unit that allows to obtain manifold closure bottoms that have different contours and are no longer only flat.

Another object is to provide a forming tool movement unit that allows to obtain manifolds capable of withstanding high operating pressures.

Another object is to provide a forming tool movement unit that is particularly sturdy and reliable.

Another object is to provide a forming tool movement unit that has a low cost and can be manufactured with known kinds of equipment and technology.

This aim and these and other objects that will become better apparent hereinafter are achieved by a forming tool movement unit, particularly for manifold closing machines, of the type that comprises a rotating head that supports forming tools so that they can slide in mutually opposite radial directions with coordinated movements, characterized in that it comprises a supporting frame on which a supporting element can slide in an axial direction with a stroke that is controlled electronically, the body of a first double-acting actuator being coupled to the supporting element so that it can rotate and move in an axial direction, said actuator being kinematically connected to motor means in order to turn it, the body of the first actuator supporting coaxially and at the front said head into which its stem extends, to move, with a stroke that is controlled electronically and with the head kinematically connected to said forming tools in order to impose their coordinated motion.

BRIEF DESCRIPTION OF THE DRAWINGS

Further characteristics and advantages of the present invention will become better apparent from the following detailed description of a preferred but not exclusive embodiment thereof, illustrated by way of non-limitative example in the accompanying drawings, wherein.

DESCRIPTION OF THE PREFERRED EMBODIMENTS

Figure 1:
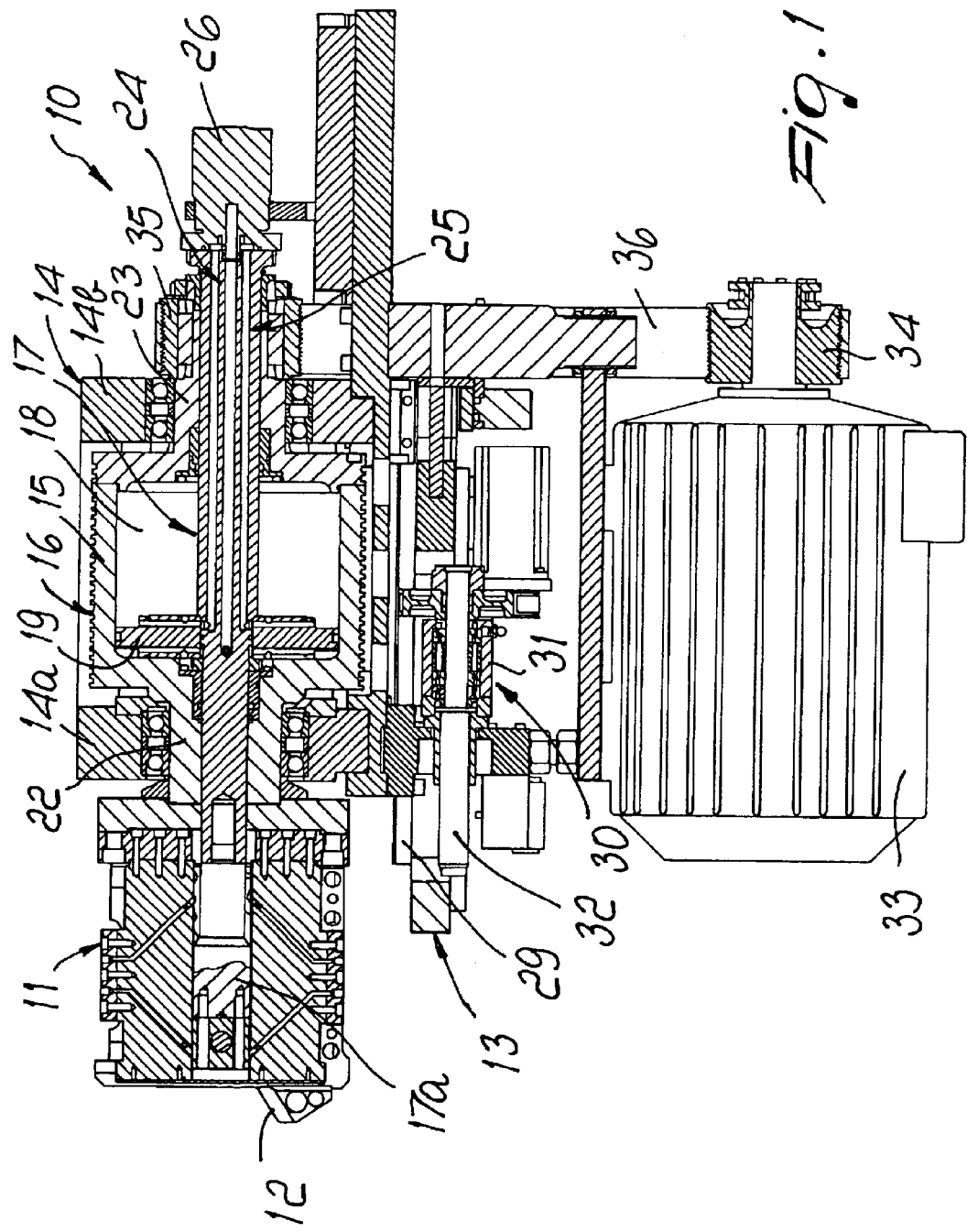
FIG. 1 is a sectional view, taken along a longitudinal plane, of a forming tool movement unit according to the invention.
Figure 2:
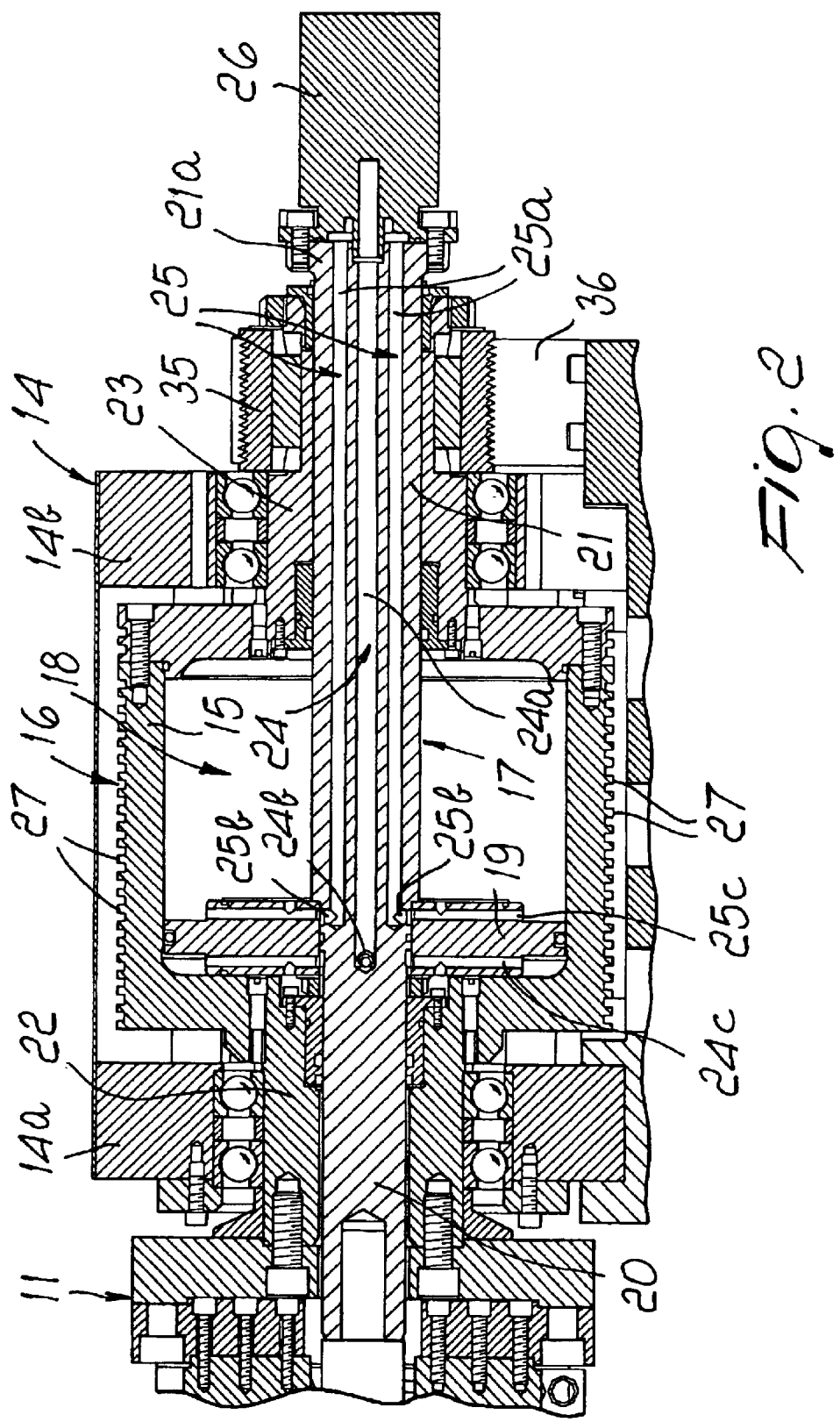
FIG. 2 is an enlarged-scale view of a portion of the movement unit of FIG. 1.
Figure 3:
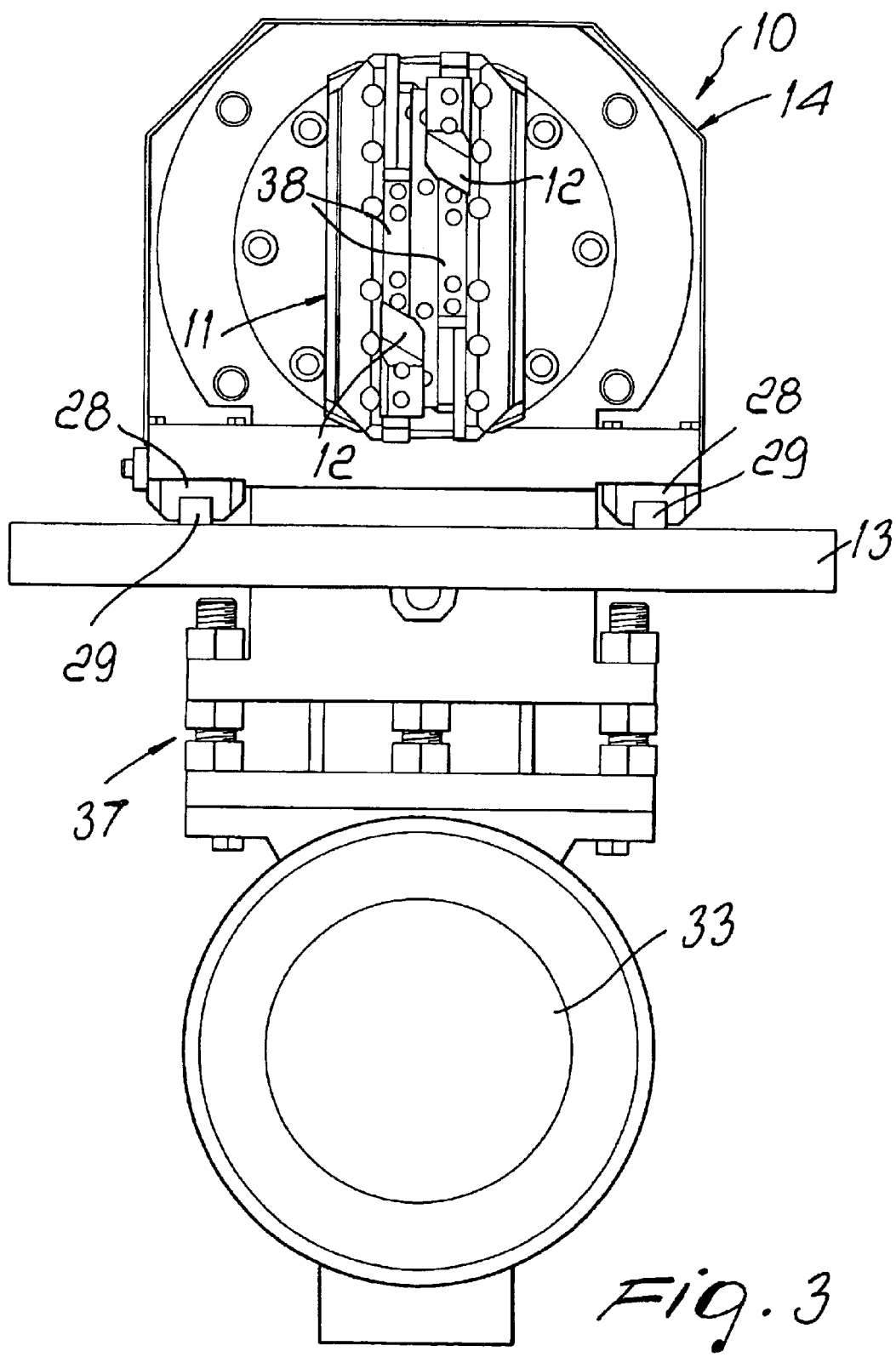
FIG. 3 is a front view of the movement unit of FIG. 1.
Figure 4:
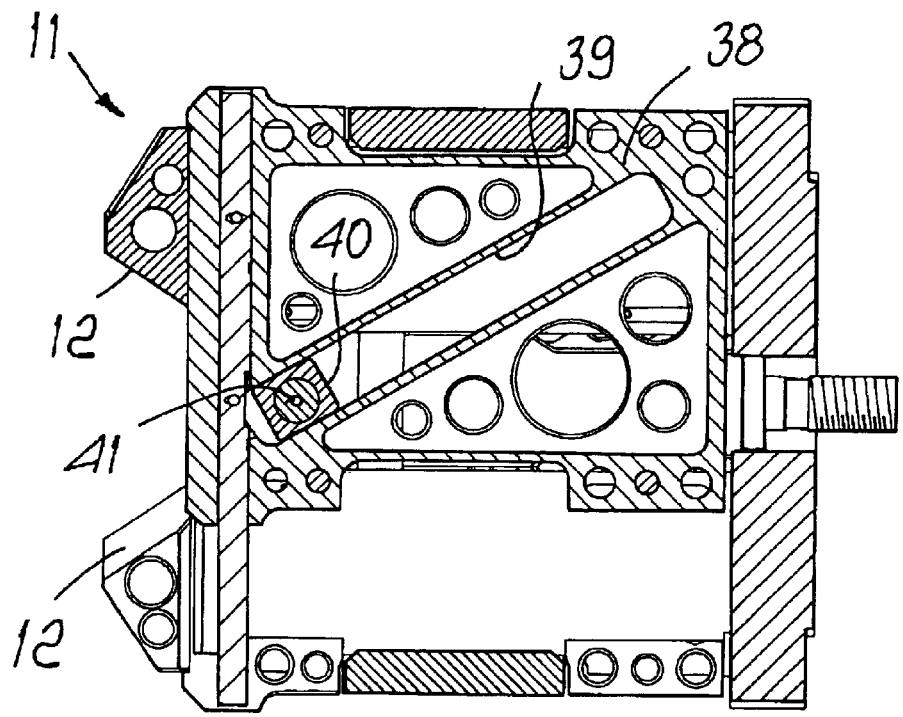
FIGS. 4, 5 and 6 are respectively two sectional perspective views, taken along two perpendicular planes, and a perspective view of a portion of the movement unit according to the invention.
Figure 5:
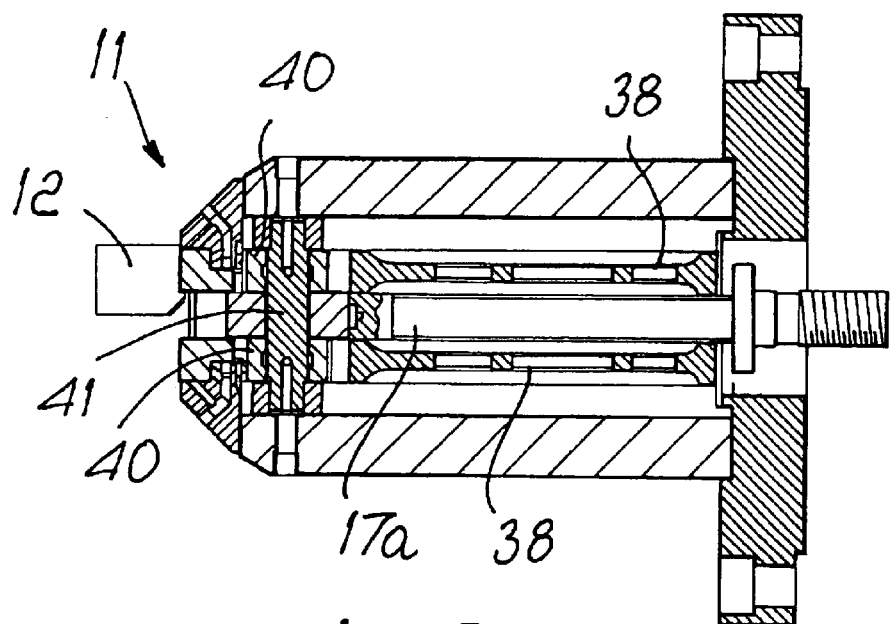
Figure 6:
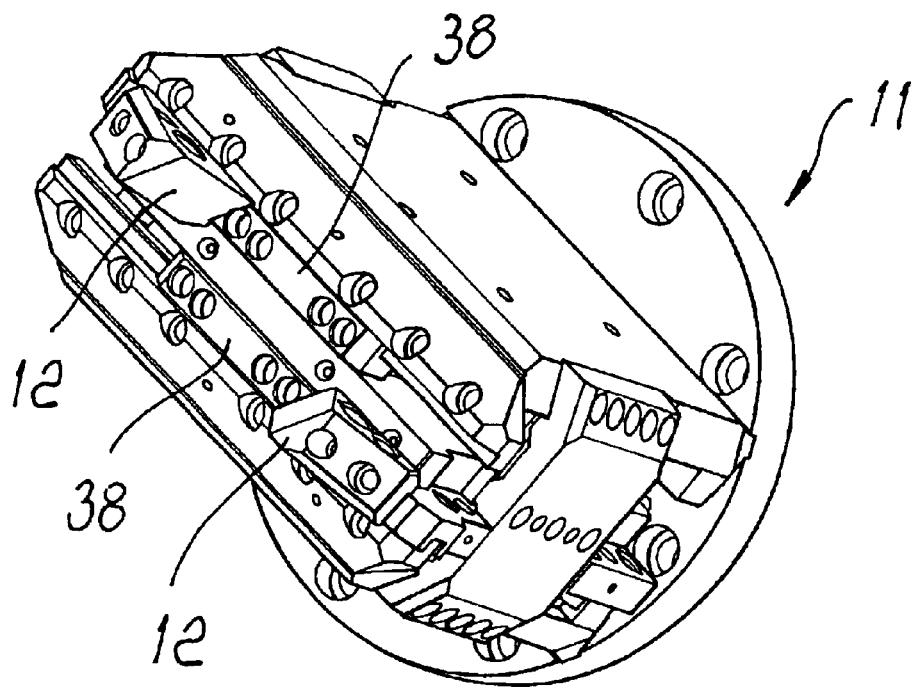

With reference to the figures, a forming tool movement unit particularly for manifold closing machines, according to the invention, is generally designated by the reference numeral 10.

The movement unit 10 is of the type that comprises a rotating head 11, which supports forming tools 12 so that they can slide in mutually opposite radial directions with coordinated motions.

The movement unit 10 comprises a supporting frame, generally designated by the reference numeral 13, on which a supporting element 14 can slide in an axial direction with an electronically controlled stroke; the body 15 of a first double-acting actuator 16 is coupled to the supporting element so that it can rotate and move in an axial direction and is kinematically connected to motor means, described in greater detail hereinafter, for rotating it.

The body 15 of the first actuator 16 coaxially supports at the front the rotating head 11, within which a portion of its stem 17 lies, that has an electronically controlled stroke and a head 17a that is kinematically connected to the forming tools 12 in order to determine their coordinated motion, as described better hereinafter.

The first actuator 16 comprises a body 15, which is suitable to form internally a cylindrical chamber 18 in which a piston 19 keyed to the stem 17 can slide hermetically; the stem passes through the body 15 with its front portion 20 and rear portion 21 relative to the piston 19.

The body 15 has a front supporting sleeve 22 a rear supporting sleeve 23 fixed thereto and rotatably coupled to the supporting element 14; the stem 17 passes hermetically through said sleeves with its front portion 20 and rear portion 21 respectively.

The rear portion 21 of the stem 17 forms internally first and second ducts 24 and 25 for the passage of pressurized fluid, which start from its free end 21a and lead into the cylindrical chamber 18, respectively in front and behind the piston 19.

The first and second ducts 24 and 25 comprise axial portions, designated by the reference numerals 24a and 25a respectively, which start from the is free end 21a of the rear portion 21 of the stem 17, and radial portions, designated by the reference numerals 24b and 25b respectively, which end respectively in front of the piston 19 and behind it, inside the cylindrical chamber 18, by way of additional portions 24c and 25c that are formed inside the piston 19.

A rotary coupling, generally designated by the reference numeral 26, is arranged on the rear free end 21a of the stem 17 and is connected to a distribution unit, not shown for the sake of simplicity but in any case of the per se known type, for the pressurized fluid that flows within the chamber 18 of the first actuator 16.

In this case, the first actuator 16 is of the pneumatic type.

Advantageously, the body 15 of the first actuator 16 is provided externally with cooling fins 27.

The supporting element 14 can slide, by means of its own sliding blocks 28, on corresponding axial straight guides 29, which are arranged on the supporting frame 13, and is associated with a corresponding second actuator, generally designated by the reference numeral 30, which is controlled electronically.

In the case shown in FIG. 1, the actuator 30 is constituted by an internally threaded sleeve 31 that is fixed to the supporting element 14 and engages with a screw-and-nut coupling on a motorized worm screw 32 that is arranged in an axial direction and is coupled rotatably to the frame 13.

Advantageously, in this case, the internally threaded sleeve 31 and the worm screw 32 are of the ballscrew type.

Figure 7:
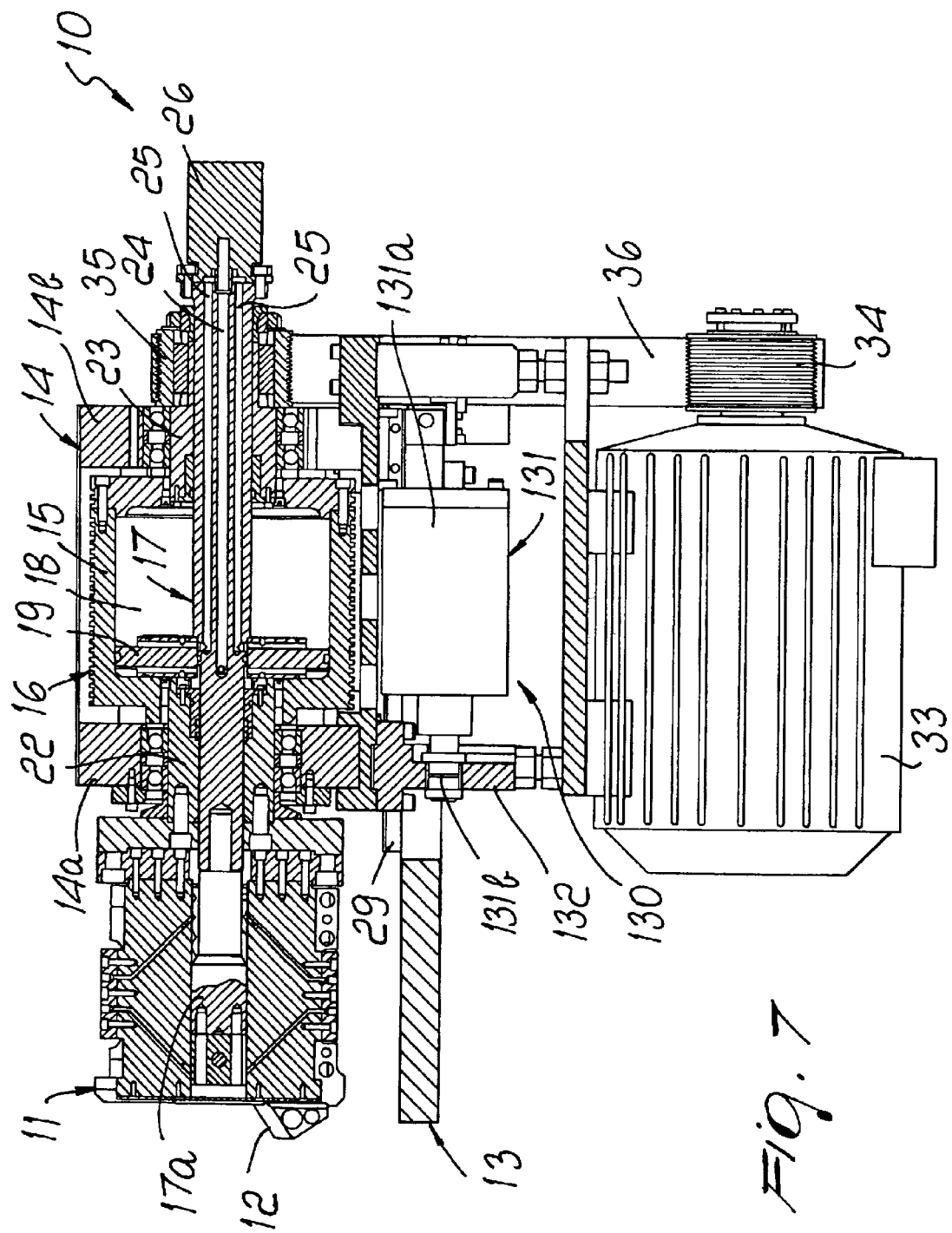
FIG. 7 is a view of a movement unit according to the invention, with one of its components in a different embodiment.

As shown in FIG. 7, the actuator can assume a second embodiment, generally designated by the reference numeral 130, which is constituted by a second actuator 131 arranged in an axial direction, with a body 131a that is fixed to the frame 13, below the supporting element 14, and a head of the stem 131b that is fixed to a lower bracket 132, which is rigidly coupled to the supporting element 14.

The motor means for turning the first actuator 16 are constituted by an electric motor 33 and a drive, described in greater detail hereinafter, that is connected to the body 15 of the first actuator 16.

A first pulley 34 is keyed to the shaft of the electric motor 33 and cooperates with a second pulley 35, which is keyed on the rear supporting sleeve 23 of the first actuator 16 in order to tension a corresponding driving belt 36.

The electric motor 33 is arranged on corresponding supporting brackets, generally designated by the reference numeral 37, which lie below the supporting element 14, under the actuator 30/130.

The supporting element 14 is constituted by a box-like body, designated by the same reference numeral, inside which the body 15 of the first actuator 16 is arranged, and on the front and rear walls of which, respectively designated by the reference numerals 14a and 14b, the front sleeve 22 and the rear sleeve 23 are respectively rotatably coupled; the head 11 and the second pulley 35 are fixed respectively to said sleeves externally to said box-like body.

The rotating head 11 is provided, at the front, with the forming tools 12, which are fixed to corresponding plates 38 that face each other, are spaced and can slide transversely in mutually opposite directions within the head 11 that forms internally their respective sliding seats.

The plates 38 comprise respective slotted holes 39, which are arranged diagonally mutually opposite and in which corresponding sliders 40 engage; said slides are arranged at the ends of a transverse pin 41, which is fixed to the head 17a of the stem 17.

As regards operation, a manifold 42 with open ends is arranged on the clamp of a manifold closing machine up to a mechanical abutment, with the open end proximate to the rotating head 11.

Once the mechanical abutment is no longer present and the head 11 is turned by the electric motor 33, the head 11 is moved forward to a work start position by way of the movement unit 30/130.

In this position, the gradual approach of the tools 12 for the closure of the manifold 42 is actuated as a consequence of the movement of the stem 17 of the first actuator 16.

Figures 8, 9:
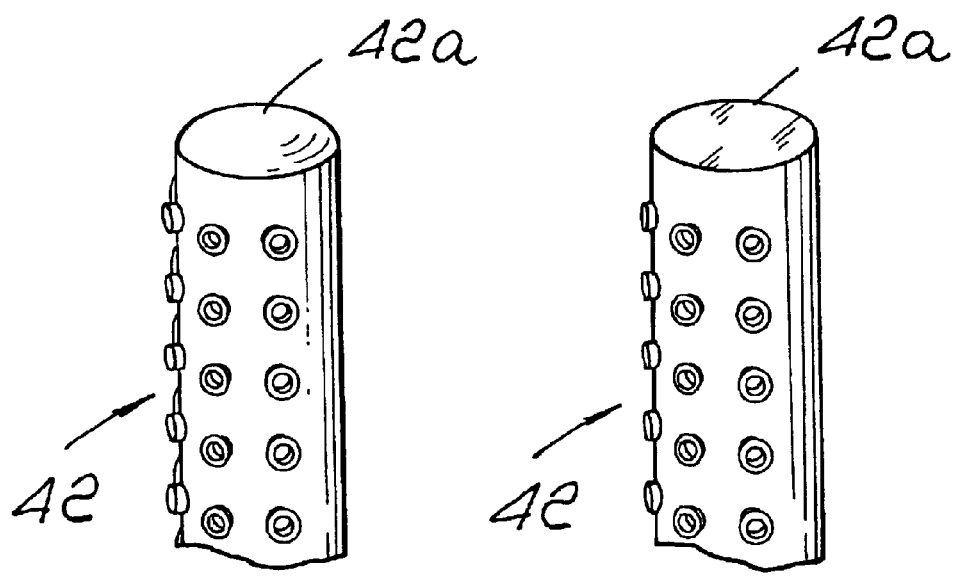
FIGS. 8 and 9 are views of bottoms of manifolds shaped by forming tools mounted on a movement unit according to the invention.

If one wishes to provide a bottom 42a that is cambered outward, as shown in FIG. 8, instead of a flat bottom 42b, as shown in FIG. 9, an axial movement of the head 11 by the actuator 30/130 is actuated simultaneously with the approach of the tools 12.

Since the first actuator 16 is of the pneumatic type, the radial movement of the tools 12 can be made to depend on the set clamping force of the tools 12 and on the resistance to deformation opposed by the manifold 42.

In practice, a radial movement of the tools 12 occurs only if the manifold 42 to be closed has reached the sufficient temperature due to friction with the tools 12.

The axial movement of the head 11 is instead a function of the radial position assumed by the tools 12 and is preset electronically in order to allow to obtain the chosen bottom shape.

In practice, both the actuator 30/130 and the first actuator 16 must be controlled electronically and managed by appropriately provided software.

Once the bottom 42a/b has been formed completely, the tools 12 become inactive again, the clamp is opened and the mechanical abutment returns into position in order to allow to unload the manifold 42 manually.

One variation of the movement unit described above is shown in FIGS. 10 to 12.

These figures show means for reducing the force required for the radial movement of the forming tools 12 on the rotating head 11, particularly for reducing the force to be applied to the first actuator 16 when the tools 12 are opened and closed.

These figures show only half of the head 11 and a single tool 12 for the sake of simplicity; the other tool is symmetrically opposite to the illustrated one.

The means consist of rotating counterweights, which are constituted by four rectangular plate-like bodies 250 that are provided with two slots 251 with corresponding stroke limiters 252.

The slots 252 are arranged in opposite portions of the plate-like bodies 250 and at right angles to the rotation axis of the head 11.

The plate-like bodies 250 are arranged so that they can slide in pairs on the inner sides of the rotating head 11 and symmetrically with respect to the slider 40.

The pairs of plate-like bodies 250 that are symmetrical with respect to the slider 40 are rigidly coupled to the plates 38 by way of pins 253 that are monolithic with the plates.

The pins 253 can slide within the corresponding slots 251; in this manner, there can be a relative translational motion at right angles to the rotation axis of the head 11 between the plates 38 and the plate-like bodies 250.

Figure 10:
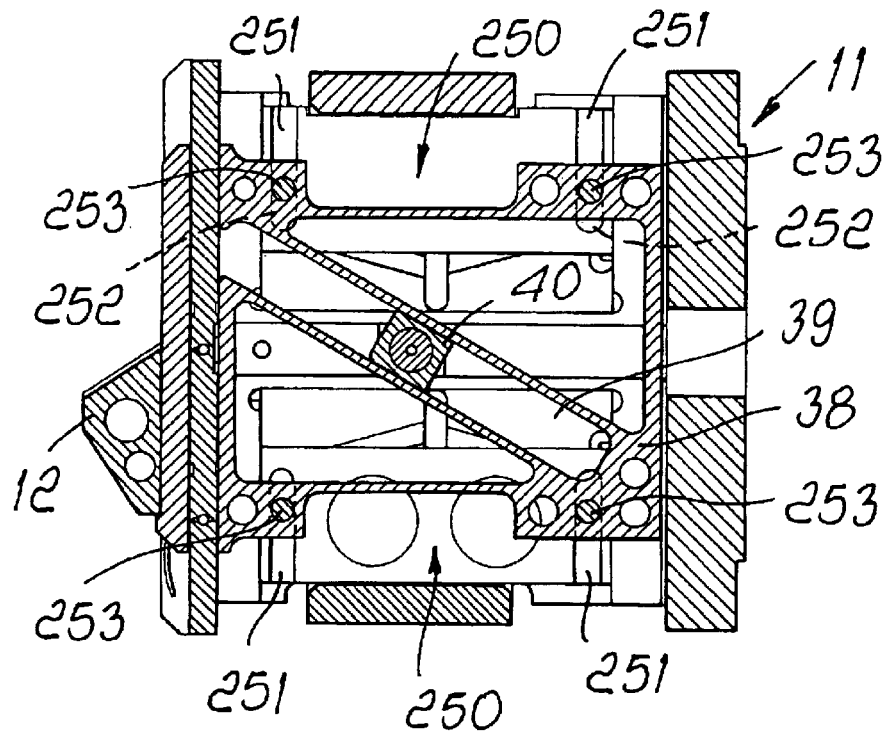
FIGS. 10, 11 and 12 are views of three separate steps of an alternative variation of the movement unit according to the invention.

With reference to FIG. 10, the two plate-like bodies 250 are shown in the position in which they are not engaged with the movable plate 38 that supports the forming tool 12.

In this position, the plate 38 is in fact arranged symmetrically to the axis of motion of the actuator 16, and the additional centrifugal force produced by the rotation of the plate-like bodies 250 is balanced, thus avoiding the generation of axial thrusts on the plate 38.

Figure 11:
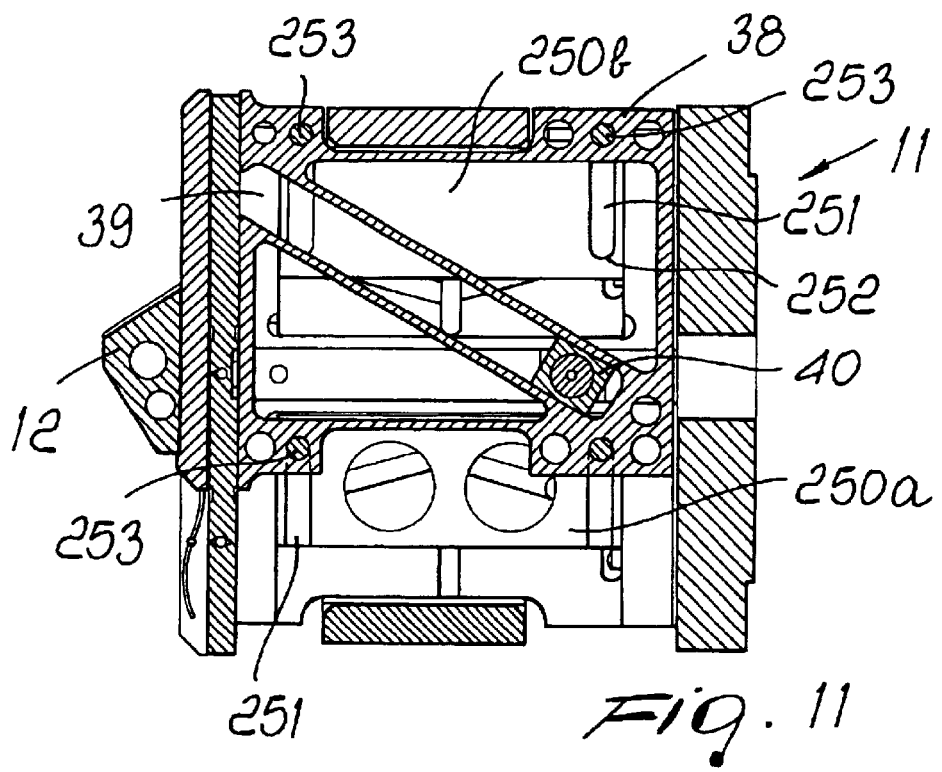

FIG. 11 illustrates the closure position of the two tools 12.

In this position, the force to be applied to the actuator 16 in order to reopen the tools 12 is reduced by the engagement to the plate 38 of the plate-like body 250*a*, which assists the upward motion of the slider 40 along the slotted holes 39 by way of the centrifugal force produced by the rotation of the head 11.

The opposite plate-like body 250*b* is disengaged from the plate 38.

Engagement occurs by way of the two pins 253, which can slide in the two slots 251 formed in said plate-like body.

The plate-like body 250 engages after a stroke determined by the position of the stroke limiters 252.

Figure 12:
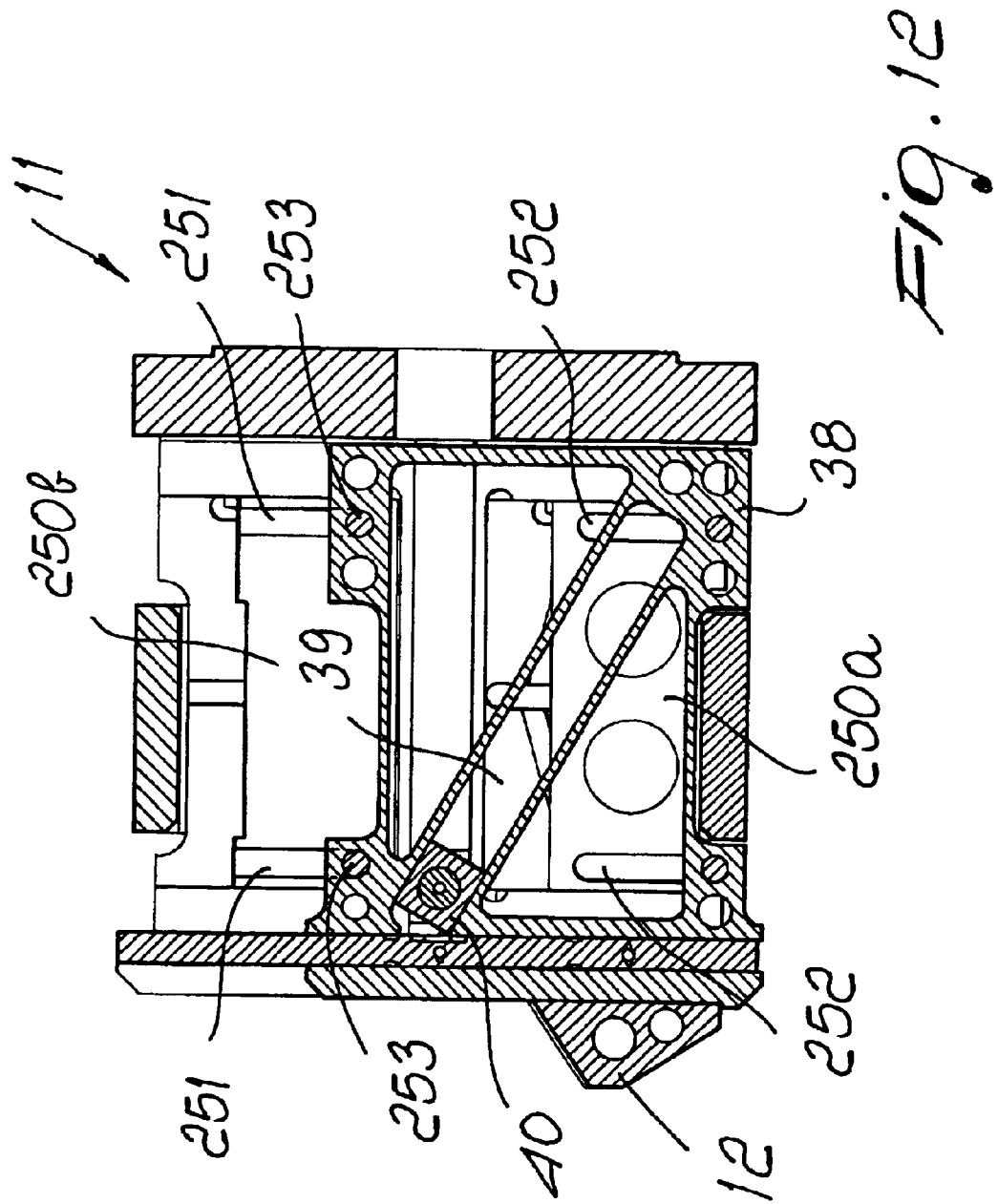

FIG. 12 illustrates the open position of the tools 12. In this case, it is the plate-like body 250*b* that is engaged with the plate 38, thus reducing the force that the actuator 16 needs to apply during the closure of the tools 12.

In practice it has been found that the present invention has achieved the intended aim and objects.

A forming tool movement unit, particularly for manifold closing machines, has in fact been provided which allows to provide bottoms for manifolds 42 that have a chosen shape, flat or cambered.

The camber, moreover, can be external or internal, using in this case differently contoured forming tools.

The movement unit further has a simple structure that can be manufactured with known types of equipment and technologies.

The present invention is susceptible of numerous modifications and variations, all of which are within the scope of the appended claims.

The technical details may be replaced with other technically equivalent elements.

The materials, so long as they are compatible with the contingent use, as well as the dimensions, may be any according to requirements.

The disclosures in Italian Patent Application No. PD2002A000219 from which this application claims priority are incorporated herein by reference.

What is claimed is:

1. A forming tool movement unit for manifold closing machines comprising: a rotating head with forming tools supported thereon that are slidable in mutually opposite radial directions with coordinated movements; a supporting frame; a supporting element which is slidable in an axial direction on said supporting frame with a stroke that is controlled electronically; a first double-acting actuator having a stem and a body that is coupled to said supporting element so as to be rotatable and, respectively, movable in an axial direction; motor means kinematically connected to said actuator for turning thereof, said body of the first actuator supporting coaxially and at a front part thereof said rotating head into which the stem of the first actuator extends and is movable with a stroke that is controlled electronically and with the rotating head kinematically connected to said forming tools in order to impose coordinated motion thereof.

2. The movement unit of claim 1, wherein said first actuator comprises said body that forms internally a cylindrical chamber with a piston therein that is slidable in a sealing manner, said piston being keyed on said stem, and said stem extending through said body, with a front portion thereof that lies in front of said piston and a rear portion thereof that lies behind the piston.

3. The movement unit of claim 2, wherein said body is rigidly provided with a front sleeve and a rear sleeve for support, said front and rear sleeves being rotatably coupled to said supporting element, said stem passing in a sealed manner through said sleeves, respectively, with said front portion and with said rear portion.

4. The movement unit of claim 3, wherein said rear portion of the stem forms internally first and second ducts for passage of fluid under pressure, said first and second ducts starting from a free end of the stem and leading into said cylindrical chamber, respectively in front of said piston and behind said piston.

5. The movement unit of claim 4, wherein said first and second ducts comprise axial portions that start from said rear free end of the stem, and radial portions that lead into respective additional radial portions formed on said piston.

6. The movement unit of claim 4, comprising a rotary coupling, said rear free end of the stem being connected with said rotary coupling, which is connected to a distribution unit for pressurized fluid for said first actuator.

7. The movement unit of claim 1, wherein said body of the first actuator is provided with cooling fins.

8. The movement unit of claim 4, wherein said first actuator is of the pneumatic type.

9. The movement unit of claim 4, comprising sliding blocks provided at said supporting element, axial straight guides and a second actuator, said supporting element being slidable with said sliding blocks on corresponding one of said axial straight guides, arranged on said supporting frame, and being connected with said second actuator that is controlled electronically.

10. The movement unit of claim 9, comprising a motorized worm screw arranged in an axial direction and rotatably coupled to said frame, said second actuator being constituted by an internally threaded sleeve, fixed in a lower region to said supporting element, and which engages with a screw-and-nut coupling thereof said motorized worm screw.

11. The movement unit of claim 9, wherein said second actuator is constituted by a second actuator arranged in an axial direction that has a body fixed to said frame below said supporting element, a head of the stem being fixed to a lower bracket of, and rigidly coupled to, said supporting element.

12. The movement unit of claim 9, wherein said motor means are constituted by an electric motor and by a transmission that is connected to said body of said first actuator.

13. The movement unit of claim 12, wherein said electric motor has a shaft, a first pulley that is keyed on said shaft, said motor means further comprising a driving belt and a second pulley that is keyed to a rear part of the rear supporting sleeve of the first actuator, in order to tension said driving belt.

14. The movement unit of claim 13, wherein said electric motor is arranged on corresponding supporting brackets of, and which protrude below, said supporting element, under said second actuator.

15. The movement unit of claim 14, wherein said supporting element is constituted by a box-like body in which said body of the first actuator is arranged, said front and rear supporting sleeves of said first actuator being rotatably coupled respectively on front and rear walls of said body, said head and said second pulley being fixed, respectively, to said front and rear sleeves, which are arranged externally with respect to said supporting element.

16. The movement unit of claim 1, comprising a transverse pin fixed to the head of said stem of the first actuator, sliders arranged at the ends of said transverse pin, and spaced plates slidable transversely in mutually opposite directions within said head, said head being provided, at a front part thereof, with said forming tools, which are fixed to corresponding ones of said facing spaced plates, said spaced plates comprising respective slotted holes which are arranged diagonally opposite and to each other, corresponding ones of said sliders engaging said slotted holes.

17. The movement unit of claim 16, comprising force reducing means arranged on said rotating head for reducing force required for radial movement of said forming tools, said force reducing means consisting of four plate-shaped bodies, which have at least one slot with a stroke limiter, and pins rigidly coupled to said plates and slidable within said at least one slot, said plate-shaped bodies being arranged slidingly in pairs at inner sides of said rotating head and symmetrically to said slider and being coupled in pairs to said plates by way of said pins.

* * * * *